United States Patent Office 3,384,593
Patented May 21, 1968

3,384,593
DETERGENT COMPOSITIONS CONTAINING A UREA-OLEFIN-SULFURIC ACID CONDENSATION PRODUCT
John D. Zech, Wilmington, Del., assignor to Atlas Chemical Industries, Inc., Wilmington, Del., a corporation of Delaware
No Drawing. Filed Oct. 21, 1965, Ser. No. 500,255
9 Claims. (Cl. 252—137)

ABSTRACT OF THE DISCLOSURE

Detergent compositions comprising a blend of synthetic detergents where one of the detergents is a water-soluble salt of an urea-olefin-sulfuric acid condensate. The olefin is either butadiene or a mixture of a major amount of butadiene and a minor amount of cyclopentadiene, unhindered tertiary mono-olefin, 2-alkyl-1,3-butadiene, or mixtures thereof. The condensate may be prepared by adding the olefin to a suspension of urea and sulfuric acid in an inert solvent at a temperature from $-10°$ C. to $70°$ C. The detergent compositions may also contain inorganic detergent builders.

The present invention relates to novel detergent compositions and, more particularly, to detergent compositions comprising novel blends of synthetic detergents.

The detergent compositions of the present invention comprise a blend of a water-soluble salt of an urea-olefin-sulfuric acid condensation product and at least one other anionic or nonionic synthetic detergent.

The condensation products of the present invention are condensates of urea, sulfuric acid, and olefin, wherein the olefin is either 1,3-butadiene or a mixture of a major amount of 1,3-butadiene and a minor amount of cyclopentadiene, unhindered tertiary mono-olefin, 2-alkyl-1,3-butadiene, or mixtures thereof, preferably at least 75 mole percent of the olefin being 1,3-butadiene.

The term "unhindered tertiary mono-olefin" as used herein denotes tertiary mono-olefins in which carbon atoms alpha, beta, and gamma to the tertiary olefinic carbon atom are free of side chain carbon. Typical examples of unhindered tertiary mono-olefins are isobutylene, 2-methyl-1-pentene, 2-methyl-2-butene, 2-methyl-1-butene, 2-methyl-2-pentene, 3-methyl-2-pentene, 2-methyl-1-hexene, 2-methyl-2-hexene, and the like. The preferred unhindered tertiary mono-olefin is isobutylene.

The 2-alkyl-1,3-butadiene is one wherein the alkyl group is unbranched and contains from 1 to 3 carbon atoms, that is diolefins of the formula

$$CH_2=CR—CH=CH_2$$

where R is an unbranched alkyl group containing from 1 to 3 carbon atoms. Examples of such diolefins are 2-methyl-1,3-butadiene (isoprene), 2-ethyl-1,3-butadiene, and 2-propyl-1,3-butadiene. The preferred 2-alkyl-1,3-butadiene is isoprene.

Although the amounts of urea, olefin, and sulfuric acid used to prepare the condensation products can vary widely, the preferred condensates are those which contain on an average, per urea residue, from about 2 to about 50 diolefin residues, from about 0.1 to about 1.5 sulfate groups, and from about 0.1 to about 10 carbon to carbon double bonds.

The condensation products are used in the form of their water-soluble salts. Of these, the alkali metal (e.g. sodium and potassium) and ammonium salts are preferred though other salts, such as amine and alkanol amine, can be used if desired.

The condensation products of the present invention and suitable methods for their preparation are fully described in copending application Ser. No. 419,201, filed Dec. 17, 1964, the disclosure of which is incorporated herein by reference. Briefly, the condensation products are prepared by reacting butadiene, alone or in admixture with 2-alkyl butadiene, cyclopentadiene, or unhindered tertiary mono-olefin, with a solution or suspension of urea in concentrated sulfuric acid and neutralizing the resulting product. These condensation products contribute both detergency and dispersability of finely divided solids to the composition.

The other synthetic detergent may be any of the conventional anionic or nonionic detergents, such as the alkyl aryl sulfonates, alkyl sulfates, alkane sulfonates, or oxyalkylene derivatives of alkyl phenols, higher monohydric alcohols, polyhydric alcohol partial fatty acid esters, and higher carboxylic acids. Typical synthetic detergents which are suitable include the following: $C_{10}$–$C_{20}$ straight chain alkyl sulfates, sodium n-lauryl sulfate, sodium (oxo) tridecyl sulfate, sodium dodecylbenzene sulfonate (straight and branched chain dodecyl), 10 to 15 polyoxyethylene nonyl phenol (straight and branched chain nonyl), 16-polyoxyethylene tall oil, 30 polyoxyethylene nonyl phenol, 40 polyoxyethylene stearic acid, 20 polyoxyethylene oleic acid, 20 polyoxyethylene lauric acid, polyoxyethylene fatty acid-urea complex, 20 polyoxyethylene sorbitan monopalmitate (Tween 40), 15 polyoxyethylene tridecyl alcohol, 10 to 15 polyoxyethylene lauryl alcohol, 20 polyoxyethylene n-octadecyl alcohol, sodium 3-polyoxyethylene tridecyl alcohol sulfate, sodium $C_{12}$–$C_{18}$ straight chain alkane sulfonates, sodium $C_{10}$–$C_{20}$ secondary alkane sulfates, sulfates and sulfonates derived from the sulfation and sulfonation of $C_{11}$ to $C_{20}$ straight chain alpha-olefins, oleate sulfopolyesters (e.g. U.S. Patent 3,016,393), and the like.

The proportion of condensation product to other detergent in the detergent compositions of the present invention may vary widely and depends to a large extent on the particular conditions under which the compositions are to be used and on economic considerations. For example, the proportion of condensation product to other detergent may range from 99:1 to 1:99. The preferred range is from 10:1 to 1:10.

In addition to the above described blend of urea-olefin-sulfuric acid condensate and conventional anionic or nonionic synthetic detergent, the detergent compositions of the present invention may also contain a major amount of any of the conventional inorganic detergent builder. The expression "inorganic detergent builder" is well known in the art and refers to various inorganic compounds which promote detergent action. Inorganic detergent builders which are in use today and which can be used in the detergent compositions of the present invention include alkali metal carbonates such as sodium carbonates, alkali metal bicarbonates, condensed phosphates such as potassium pyrophosphate and sodium polyphosphate, silicates such as sodium silicate, and the like. Additives such as water softeners, wetting agents, ion sequestering agents, optical brighteners, chemical bleaching agents, antiredeposition agents such as carboxymethyl cellulose and sodium carboxymethyl cellulose, foaming agents, and the like can also be used. The specific builders and additives and the amounts therof incorporated in the detergent composition of the present invention can vary widely and depends to a large extent on economic considerations and on the particular conditions under which the detergent compositions are utilized.

The following examples illustrate the manner in which the invention may be practiced, but it is to be understood that such details are given merely for exemplification purposes and are not to be construed as limiting the scope of the appended claims. Unless otherwise indicated, the proportions are expressed in parts by weight.

To determine the detergent efficiencies reported in several of the examples, samples of standard soiled cotton cloth were subjected to the standard Terg-O-Tometer washing test employing the test composition in one cup and an accepted standard detergent in another. The washings were done at 120° F. using 0.25 weight percent of detergent in water of 200 parts per million hardness. Increases in reflectance of the washed samples were compared. The standard detergent employed in the controls comprises 15 parts sodium dodecylbenzene sulfonate Ultrawet K) 7.5 parts sodium secondary alkyl sulfate (10–20 carbon alkyl), 32.6 parts sodium tripolyphosphate (STPP), 9.3 parts sodium metasilicate, 36.3 parts sodium carbonate and 0.93 part sodium carboxymethyl cellulose (CMC).

The detergent efficiency reported in each case is 100 times the ratio of the increase in reflectance of the sample washed in the test detergent to that of the sample washed in the control or standard detergent.

Example I 15 parts sodium salt of a condensation product of 3 moles butadiene, 1 mole urea, and 1.5 moles of sulfuric acid and having an acid number of 14, an iodine number of 132, a melting point of 105–114° C., 4.96% nitrogen, and 5.24% sulfur, are blended with 7.5 parts 10 to 20 carbon atom secondary alkyl sulfate sodium salt, 32.6 parts sodium tripolyphosphate (STPP), 9.3 parts sodium metasilicate, 36.3 parts sodium carbonate, and 0.93 part sodium carboxymethyl-cellulose (CMC) to a fine powder in a household high-speed blender. The detergent efficiency of this blend was 103.5%.

Example II 15 parts sodium salt of a condensation product of 3.8 moles of butadiene, 0.2 mole of isobutylene, and 1.5 moles of sulfuric acid, and having an iodine number of 154 and containing 3.92% nitrogen are blended with 7.5 parts 10 to 20 carbon atom secondary alkyl sulfate sodium salt, 32.6 parts STPP, 9.3 parts sodium metasilicate, 36.3 parts sodium carbonate, and 0.93 part CMC to a fine powder in a household high-speed blender.

Example III 15 parts sodium salt of a butadiene condensation product with urea and sulfuric acid, 7.5 parts sodium dodecylsulfate, 32.6 parts STPP, 9.3 parts sodium metasilicate, 36.3 parts sodium carbonate, and 0.93 part CMC are blended to a fine powder in a household high-speed blender. Its detergent efficiency was 103%.

Example IV 7.5 parts sodium salt of a butadiene condensation product with urea and sulfuric acid, 7.5 parts sodium dodecylbenzenesulfonate, 35 parts STPP, 10 parts sodium metasilicate, 39 parts sodium carbonate, 1 part CMC, and .25 part optical brightener (Tinopal RBS–200) are blended to a fine power in a household high-speed blender. Its detergent efficiency was 101.2%.

Example V 15 parts sodium salt of a butadiene condensation product with urea and sulfuric acid, 7.5 parts polyoxyethylene nonylphenol containing about 30 oxyalkylene units, 32.6 parts STPP, 9.3 parts sodium metasilicate, 36.3 parts sodium carbonate, and 0.93 part CMC are blended to a fine powder in a household high-speed blender. Its detergent efficiency was 102.2%.

Example VI 15 parts sodium salt of a butadiene condensation product with urea and sulfuric acid, 7.5 parts of polyoxyethylenenonylphenol containing about 12-13 oxyethylene units, 32.6 parts STPP, 9.3 parts sodium metasilicate, 36.3 parts sodium carbonate, and 0.93 part CMC are blended to a fine powder in a household high-speed blender. Its detergent efficiency was 104.7%.

Example VII 15 parts sodium salt of a 4:1 butadiene-cyclopentadiene (mole ratio) condensation product with urea and sulfuric acid, 7.5 parts polyoxyethylene nonylphenol containing about 12–13 oxyethylene units, 32.6 parts STPP, 9.3 parts sodium metasilicate, 36.3 parts sodium carbonate, and 0.93 part CMC are blended to a fine powder in a household high-speed blender.

Example VIII 15 parts sodium salt of a butadiene condensation product with urea and sulfuric acid, 7.5 parts polyoxyethylene tall oil containing about 15 oxyethylene units, 32.6 parts STPP, 9.3 parts sodium metasilicate, 36.3 parts sodium carbonate, and 0.93 part CMC are blended to a fine powder in a household high-speed blender. Its detergent efficiency was 104%.

Example IX 7.5 parts sodium salt of butadiene condensation product with urea and sulfuric acid, 7.5 parts polyoxyethylene stearic acid containing about 40 oxyethylene units, 35 parts STPP, 10 parts sodium metasilicate, 39 parts sodium carbonate, and 1 part CMC are blended to a fine powder in a household high-speed blender. Its detergent efficiency was 104%.

Example X 7.5 parts sodium salt of a 9:1 butadiene-isoprene (mole ratio) condensation product with urea and sulfuric acid, (prepared from 3.6 moles of butadiene, 0.4 mole of isoprene, 1 mole of urea, and 1.5 moles of sulfuric acid and having an acid number of 8.6, an iodine number of 171, 3.30% nitrogen, and 4.80% sulfur), 7.5 polyoxyethylene stearic acid containing about 40 oxyethylene units, 35 parts STPP, 10 parts sodium metasilicate, 39 parts sodium carbonate, and 1 part CMC are blended to a fine powder in a household high-speed blender.

Example XI 7.5 parts sodium salt of a butadiene condensation product with urea and sulfuric acid, 7.5 parts polyoxyethylene tridecyl alcohol containing about 15 oxyethylene units, 32.6 parts STPP, 9.3 parts sodium metasilicate, 36.3 parts sodium carbonate, and 0.93 part CMC are blended to a fine powder in a household high-speed blender. Its detergent efficiency was 101.2%.

Detergent composition in accordance with the invention are also useful in the kier boiling of cotton. An excellent kier boiling solution, for example, comprises an aqueous solution containing 1.5% by weight of sodium hydroxide, 0.25% tetrasodium pyrophosphate and 0.05% of a blend of equal parts of sodium butadiene-urea-sulfate and a polyoxyethylene ether of tertiary octyl phenol containing 12-13 oxyethylene groups per mole. Unbleached corded cotton sateen boiled for 2 hours in such a solution well rinsed in fresh water and dried was found to be very effectively freed of wax.

The above examples and description are to be taken as only illustrative of the invention and a number of its preferred embodiments and it is to be understood that many further variations and modifications of the invention may be made by those skilled in the art without departing from the scope and spirit of the invention which are defined in the appended claims.

What is claimed is:

1. A detergent composition consisting essentially of a blend of (B) a water-soluble salt of an urea-olefin-sulfuric acid condensation product and (A) at least one other detergent selected from the group consisting of nonionic synthetic detergents and anionic synthetic detergents wherein the proportion of (A) to (B) is from 99:1 to 1:99, said condensation product being prepared by (1) forming a suspension of urea and from 0.75 to 3.0 molar proportions of a sulfuric acid solution containing from 85 to 105 percent by weight of equivalent $H_2SO_4$ in an inert organic diluent; (2) introducing into the said suspension, with continuous agitation and at a temperature of from $-10°$ C. to $70°$ C., from 0.8 to 10 molar proportions of an olefin selected from the group consisting of 1,3-butadiene and a mixture of a major proportion of 1,3-butadiene and a minor proportion of a member selected from the group consisting of cyclopentadiene, unhindered tertiary mono-olefins, and 2-alkyl 1,3-butadienes wherein the alkyl radical is unbranched and contains from 1 to 3 carbon atoms; (3) and recovering the condensation product from the reaction mixture, all of said molar proportions being per molar proportion of urea.

2. The detergent composition of claim 1 wherein (A) is a non-ionic synthetic detergent.

3. The detergent composition of claim 1 wherein A is an anionic synthetic detergent.

4. A detergent composition consisting essentially of a blend of (A) a synthetic detergent selected from the group consisting of alkyl aryl sulfonates, alkane sulfonates, alkyl sulfates, polyoxyalkylene derivatives of alkyl phenols, polyoxyalkylene derivatives of fatty acids, polyoxyalkylene derivatives of higher monohydric alcohols, and polyoxyalkylene derivatives of polyhydric alcohol partial fatty acid esters and (B) a water-soluble salt of an urea-olefin-sulfuric acid condensation product wherein the proportion of (A) to (B) is from 99:1 to 1:99, said condensation product being prepared by (1) forming a suspension of urea and from 0.75 to 3.0 molar proportions of a sulfuric acid solution containing from 85 to 105 percent by weight of equivalent $H_2SO_4$ in an inert organic diluent; (2) introducing into the said suspension, with continuous agitation at a temperature of from $-10°$ C. to $70°$ C., from 0.8 to 10 molar proportions of an olefin selected from the group consisting of 1,3-butadiene and a mixture of a major proportion of 1,3-butadiene and a minor proportion of a member selected from the group consisting of cyclopentadiene, unhindered tertiary mono-olefins, and 2-alkyl 1,3-butadienes wherein the alkyl radical is unbranched and contains from 1 to 3 carbon atoms; (3) and recovering the condensation product from the reaction mixture, all of said molar proportions being per molar proportion of urea.

5. The detergent composition of claim 4 wherein (B) is an alkali metal salt or an ammonium salt.

6. A detergent composition consisting essentially of a major amount by weight of inorganic detergent builder and a minor amount by weight of the blend of claim 5.

7. The detergent composition of claim 6 wherein the inorganic detergent builder is selected from the group consisting of alkali metal carbonates, alkali metal bicarbonates, alkali metal condensed phosphates, alkali metal silicates, and mixtures thereof.

8. The detergent composition of claim 7 wherein (A) is a synthetic detergent selected from the group consisting of alkyl sulfates containing from 10 to 20 carbon atoms, sodium lauryl sulfate, sodium (oxo) tridecyl sulfate, sodium dodecyl benzene sulfonate, polyoxyethylene nonyl phenol containing from 10 to 15 oxyethylene groups, polyoxyethylene(16)tall oil, polyoxyethylene(30) nonyl phenol, polyoxyethylene(40)stearic acid, polyoxyethylene(20)oleic acid, polyoxyethylene(20)lauric acid, polyoxyethylene(20)sorbitan monopalmitate, polyoxyethylene(15)tridecyl alcohol, polyoxyethylene lauryl alcohol containing from 10 to 15 oxyethylene groups, polyoxyethylene(20)octadecyl alcohol, sodium polyoxyethylene(3)tridecyl alcohol sulfate, sodium alkane sulfonates containing from 12 to 18 carbon atoms, sodium alkane sulfates containing from 10 to 20 carbon atoms, sulfated straight chain alpha olefins containing from 11 to 20 carbon atoms, sulfonated straight chain alpha olefins containing from 11 to 20 carbon atoms, and mixtures thereof.

9. A detergent composition consisting essentially of a sodium salt of an alkyl sulfate containing from 10 to 20 carbon atoms in the alkyl group, sodium polyphosphate, sodium silicate, sodium carbonate, sodium carboxymethylcellulose, and a water-soluble salt of an urea-olefin-sulfuric acid condensation product, said condensation product being prepared by (1) forming a suspension of urea and from 0.75 to 3.0 molar proportions of a sulfuric acid solution containing from 85 to 105 percent by weight of equivalent $H_2SO_4$ in an inert organic diluent; (2) introducing into the said suspension, with continuous agitation and at a temperature of from $-10°$ C. to $70°$ C., from 0.8 to 10 molar proportions of an olefin selected from the group consisting of 1,3-butadiene and a mixture of a major proportion of 1,3-butadiene and a minor proportion of a member selected from the group consisting of cyclopentadiene, unhindered tertiary mono-olefins, and 2-alkyl 1,3-butadienes wherein the alkyl radical is unbranched and contains from 1 to 3 carbon atoms; (3) and recovering the condensation product from the reaction mixture, all of said molar proportions being per molar proportion of urea.

References Cited

FOREIGN PATENTS 6,500,872   7/1965   Netherlands.

OTHER REFERENCES

Surface Active Agents and Detergents, vol. II, Schwartz et al., Interscience Publ., New York, 1958, pages 288, 296, 297, 302–307, 314–315.

LEON D. ROSDOL, *Primary Examiner.*

S. D. SCHNEIDER, S. E. DARDEN,
*Assistant Examiners.*